US010357931B2

(12) United States Patent
Jespersen et al.

(10) Patent No.: US 10,357,931 B2
(45) Date of Patent: Jul. 23, 2019

(54) SYSTEM AND METHOD FOR MANUFACTURING A WIND TURBINE BLADE COMPONENT

(71) Applicant: LM WP PATENT HOLDING A/S, Kolding (DK)

(72) Inventors: Klavs Jespersen, Kolding (DK); Tim Møller Hansen, Vamdrup (DK); Lars Nielsen, Skanderborg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 213 days.

(21) Appl. No.: 15/037,340

(22) PCT Filed: Nov. 18, 2014

(86) PCT No.: PCT/EP2014/074855
§ 371 (c)(1),
(2) Date: May 18, 2016

(87) PCT Pub. No.: WO2015/075014
PCT Pub. Date: May 28, 2015

(65) Prior Publication Data
US 2016/0279890 A1 Sep. 29, 2016

(30) Foreign Application Priority Data
Nov. 19, 2013 (EP) .................................... 13193536

(51) Int. Cl.
*B29D 99/00* (2010.01)
*B29C 45/14* (2006.01)
(Continued)

(52) U.S. Cl.
CPC .... *B29D 99/0028* (2013.01); *B29C 45/14336* (2013.01); *F03D 1/0675* (2013.01);
(Continued)

(58) Field of Classification Search
CPC .......... B29D 99/0028; B29C 45/14336; F03D 1/0675; F05B 2230/21; B29K 2075/00;
(Continued)

(56) References Cited

U.S. PATENT DOCUMENTS 6,849,150 B1  2/2005  Schmidt
2007/0021575 A1*  1/2007  Rodriguez .............. C07F 5/027
526/134
(Continued)

FOREIGN PATENT DOCUMENTS

EP   1745914 A2    1/2007
WO   2013/037466 A1  3/2013

OTHER PUBLICATIONS

Kari Williamson, Bayer Develops polyurethane composite for wind turbine (Dec. 20, 2011) (Year: 2011).*
(Continued)

*Primary Examiner* — Nahida Sultana
(74) *Attorney, Agent, or Firm* — Nath, Goldberg & Meyer; Tanya E. Harkins; Jerald L. Meyer

(57) ABSTRACT

A system and method for the manufacture of a wind turbine blade component is described, preferably a shear web component for a wind turbine. The shear web is manufactured by using a forming tool to define a flange-shaped cavity at an end of a web member. A resin is injected into the cavity and cured to form a flange cast onto the web member. The forming tool is subsequently removed from the web member to provide a component having a load-bearing flange formed from a cured resin.

14 Claims, 6 Drawing Sheets

(51) Int. Cl.
*F03D 1/06* (2006.01)
*B29L 31/08* (2006.01)
*B29K 105/12* (2006.01)
*B29K 75/00* (2006.01)

(52) U.S. Cl.
CPC ...... *B29K 2075/00* (2013.01); *B29K 2105/12* (2013.01); *B29L 2031/085* (2013.01); *F05B 2230/21* (2013.01); *Y02E 10/721* (2013.01); *Y02P 70/523* (2015.11)

(58) Field of Classification Search
CPC . B29K 2105/12; Y02E 10/721; Y02P 70/523; B29L 2031/085
USPC .......... 264/241, 252, 254, 259, 260
See application file for complete search history.

(56) References Cited

U.S. PATENT DOCUMENTS

| | | | |
|---|---|---|---|
| 2008/0277834 A1* | 11/2008 | Schibsbye | B29C 33/26 264/334 |
| 2011/0116935 A1* | 5/2011 | Wansink | B29C 66/721 416/229 R |
| 2012/0027610 A1 | 2/2012 | Yarbrough | |
| 2012/0093656 A1* | 4/2012 | Esaki | F03D 1/0675 416/229 R |
| 2012/0263937 A1* | 10/2012 | Prissok | B29C 44/1209 428/312.6 |
| 2012/0313291 A1* | 12/2012 | Stege | B29C 70/74 264/259 |
| 2013/0068888 A1* | 3/2013 | Smith | F01D 5/147 244/124 |
| 2013/0294923 A1* | 11/2013 | Takeuchi | F03D 1/0675 416/241 A |
| 2014/0186188 A1* | 7/2014 | Takeuchi | F03D 1/0675 416/224 |
| 2016/0052173 A1* | 2/2016 | Hunter | B29C 70/34 416/230 |
| 2016/0215757 A1* | 7/2016 | Behmer | B29C 70/086 |
| 2017/0074240 A1* | 3/2017 | Caruso | F03D 1/0675 |
| 2018/0252202 A1* | 9/2018 | Johnson | B29C 70/342 |
| 2019/0024630 A1* | 1/2019 | Madsen | B29C 70/52 |

OTHER PUBLICATIONS

ISR issued in international application No. PCT/EP2014/074855 dated Jan. 28, 2015.

* cited by examiner

SYSTEM AND METHOD FOR MANUFACTURING A WIND TURBINE BLADE COMPONENT

This is a National Phase Application filed under 35 U.S.C. 371 as a national stage of PCT/EP2014/074855, filed Nov. 18, 2014, an application claiming the benefit from the European patent Application No. 13193536.3, filed Nov. 19, 2013, the content of each of which is hereby incorporated by reference in its entirety.

FIELD OF THE INVENTION

The present invention relates to a system and method for manufacturing a wind turbine blade component, in particular a component having a load-carrying flange, and a component for a wind turbine blade manufactured according to the system and method.

BACKGROUND OF THE INVENTION

Wind turbine blades are often formed having an external blade shell formed of a relatively thin-wall composite material. A large number of wind turbine blade designs employ the use of internal shear webs, spars or supports which extend between opposed internal surfaces of such blade shells. Such shear webs act to reinforce the blade structure, and prevent excessive bending or buckling.

Some blade designs use shear webs formed from beam members having I- or C-shaped cross-sections, the members having a main body with load-bearing flanges extending therefrom at opposed ends of the main body.

One method of manufacturing such I- or C-webs is through the provision of a sandwich panel body to which layers of fibre material are applied at the opposed ends in the shape of the desired flanges, the fibre material being infused with a resin and subsequently cured to form rigid flanges.

It is well-known to manufacture such shear webs in a suitably shaped mould structure, wherein a C-web can be manufactured using a relatively simple U-shaped mould, where the sandwich panel body extends between opposed walls of the mould structure, with the flanges formed through the layup of fibre material against the said walls.

Similarly, an I-web can be manufactured using a mould having opposed mould walls, the mould further comprising a central support bounded by flexible support members on either side to define an adjustable channel between the flexible support members and the opposed mould walls. In this situation, the sandwich panel body is arranged on the central support, while the adjustable channel is arranged to receive fibre layers to form the flanges on a first side of the panel body, with the flanges on the second side of the panel body formed by the layup of fibre material against the opposed mould walls. Such I-web moulds have been in use by the Applicant for almost 10 years, while such C-webs are known in the wind turbine industry for a longer period of time.

An example of such manufacturing systems can be seen in International Patent Application Publication No. WO 2013/037466 A1.

However, such systems require the provision of dedicated moulding tables for the formation of such shear webs, which can often be continuous structures in excess of 30-40 meters length, taking up considerable space in a blade factory. Also, the application, infusion and subsequent curing of the fibre layers to form the flanges of the shear webs requires relatively precise alignment and working, resulting in considerable time and operational costs.

Furthermore, in the case of I-web manufacture, the particular flexible profiles used can be unique to the different design of blade and the associated I-web required. This can therefore result in additional manufacturing and setup costs when it is desired to produce I-webs for use in different wind turbine blades.

In addition to the above, shear webs having such resin-infused fibre-based flanges can be an area of interest for the prevention of structural faults and cracks, due to the relatively large forces transferred through said flanges.

It is an object of the invention to provide an alternative system and method for the manufacture of wind turbine blade components, and in particular shear webs, which provides for increased ease of manufacture combined with a reduced risk of structural failure.

SUMMARY OF THE INVENTION

Accordingly, there is provided a method of manufacturing a wind turbine blade component having a load-carrying flange, the method comprising the steps of:
providing a web member;
arranging a forming tool adjacent at least a first end of said web member to form a flange-shaped cavity between said forming tool and said first end;
injecting a load-carrying resin into said cavity, preferably a polyurethane resin;
curing said resin to form a load-carrying flange comprised of cured resin at said first end; and
removing said forming tool from said first end.

The method provides a simple way of manufacturing blade components, and shear webs in particular, which are cost-effective and have improved durability and reliability compared to the prior art. The use of polyurethane resin allows for the formation of strong, load-bearing flanges which can adequately transfer loading between blade components. It will be understood that a plurality of forming tools may be used along the length of the web member, which be in excess of 30 meters in length.

In addition, as the formation of the load-bearing flanges at the end of the web member is achieved through the use of a forming tool arranged to define a cavity to receive resin, the web member itself can be simply supported in a workshop, e.g. using a plurality of simple table supports, which eliminates the need for a relatively large and expensive mould structure.

Preferably, the method further comprises the step of sealing said cavity between said forming tool and said first end of said web member.

Preferably, the method comprises the step of applying a sealant between said forming tool and said first end of said web member.

The sealant may comprise a simple strip of material, possibly with adhesive properties, applied between edges of the forming tool and the surface of the web member, e.g. a silicone gel. It will be understood that the forming tool may additionally or alternatively be provided with suitable sealing flanges, e.g. a resilient material operable to form an effective seal against the surface of the web member.

Preferably, the method comprises the step of removing said sealant after said step of curing.

Preferably, said step of providing a web member comprises providing a sandwich panel or a sandwich-structured composite member.

Such a sandwich panel may comprise skin layers of reinforcement material, e.g. fibre-reinforced composite material, applied to a relatively thick light-weight core material. The core material may be a low strength material, but its higher thickness provides the sandwich composite with high bending stiffness with overall low density.

The load-bearing resin may be chosen from the group of a polyurethane resin, a fibre-reinforced resin, e.g. polyurethane reinforced with fibres.

In one embodiment according to the invention, the method comprises the step of providing a forming tool having a primary plate member and at least one barrier member depending therefrom, and wherein the step of arranging comprises:
  positioning said primary plate member adjacent the first end of said web member, and
  positioning said at least one barrier member where said at least one barrier member extends between said primary plate member and a side face of said web member adjacent said first end, such that said cavity is at least partially formed between said primary plate member, said at least one barrier member, and said web member.

The primary plate member acts to define the primary surface of the load-bearing or load-carrying flange to be formed by the process.

Preferably, said primary plate member is positioned such that a space of between approximately 1-20 mm, preferably between approximately 2-15 mm, is between said primary plate member and said first end of said web member.

By arranging the primary plate member at such a distance from the end of the web member, the depth of the flange formed by the forming tools at the ends of the web member can be accurately controlled.

Preferably, said at least one barrier member is positioned such that a free end of said at least one barrier member is located at a point along the side face of said web member between approximately 25-125 mm, preferably between approximately 50-100 mm, from the first end of said web member.

The arrangement of the barrier member in this manner allows for the formation of a side flange on the web member which extends along the side face of the web member for a sufficient distance to effectively transfer loading from the flange to the web member.

Preferably, the method comprises the step of providing said at least one barrier member such that said at least one barrier member presents a convex inner surface of said cavity, between said primary plate member and said side face of said web member Providing a convex inner surface of the flange-shaped cavity results in the formation of a flange having a concave surface extending from the side face of the web member. This results in improved structural properties of the formed flange, having improved failure resistance at the edges of the flange. It will be understood that the barrier member may be shaped to present any desired profile, such that the load-carrying flange may have an desired shape, e.g. a bell-shaped flange, a triangle shaped flange, etc.

Preferably, said primary plate member presents a first surface of said cavity, said first cavity surface shaped to form a first surface of the load-carrying flange, wherein said step of positioning said primary plate member comprises angling said primary plate member relative to said first end of said web member in a desired orientation for the load-carrying flange of the wind turbine blade component.

As the profile of the wind turbine blade which the blade component is being manufactured for may have a particular curvature, the primary surface of the flange may require arrangement at a specific angle relative to the web body. This angle may vary along the length of the component, dependent on the longitudinal profile of the blade. Accordingly, the forming tool may be made of a relatively flexible material to allow for variations in the angling of the tool along the length of the web member, and/or a plurality of forming tools may be used arranged at different angles relative to the web member along the length of the web member.

Preferably, said step of angling comprises arranging said primary plate member at an angle of between −5 to +20 degrees to the first end of said web member.

In a preferred aspect, said primary plate member is configured to provide a shaped first surface of said cavity, such that said first surface of the load-carrying flange formed by said cavity is provided with a shaped surface, for example a rippled, hatched or scored surface profile.

The provision of a shaped or treated flange surface at the end of the component can provide a surface which provides an improved adhesive bond between components.

Preferably, said step of injecting comprises supplying resin at a first end of said cavity.

Preferably, the method comprises supplying said resin at an overpressure, or at a pressure level above atmospheric pressure.

Preferably, said step of injecting comprises applying a vacuum at an opposed second end of said cavity.

In a preferred aspect, said step of providing a forming tool comprises providing:
  a primary plate member; and
  first and second barrier members located towards opposed longitudinal sides of said primary plate member, and
  wherein said step of arranging comprises:
  positioning said primary plate member adjacent the first end of said web member, and
  positioning said first and second barrier members such that said barrier members extend between opposed longitudinal sides of said primary plate member and opposed side faces of said web member adjacent said first end, such that said cavity is at least partially formed between said primary plate member, said web member, and said first and second barrier members.

Preferably, said step of positioning said first and second barrier members comprises arranging said first and second barrier members on said primary plate member at a distance of between approximately 50-150 mm, preferably between approximately 60-120 mm, preferably approximately 90 mm, between said first and second barrier members.

Preferably, said flange-shaped cavity is an elongate cavity, and said method comprises the step of sealing opposed ends of said cavity.

Preferably, said web member comprises an elongate planar body having opposed first and second ends, and wherein the method comprises:
  applying a first forming tool at a first end of said planar body to form a first flange-shaped cavity;
  applying a second forming tool at a second end of said planar body to form a second flange-shaped cavity;
  injecting a load-carrying resin into said first and second cavities, preferably a polyurethane resin;
  curing said resin to form first and second load-carrying web flanges comprised of cured resin at respective first and second ends of said planar body; and removing said first and second forming tools to provide a wind turbine blade component having first and second web flanges located at opposed ends of said web member.

In one aspect, the first tool may be re-used as the second tool after the step of forming the first web flange. In a preferred aspect, said first and second tools are applied simultaneously.

In one aspect, the resin comprises a quantity of fibre material mixed into the resin, e.g. chopped fibres.

By incorporating chopped fibres into the resin, the strength of the formed load-bearing flange may be improved.

There is further provided a method of manufacture of a part of a wind turbine blade comprising manufacturing at least one wind turbine blade component as described above, and joining said at least one wind turbine blade component to a second component of the wind turbine blade via the load-carrying flange of said at least one wind turbine blade component.

Preferably, the said at least one wind turbine blade component is a shear web.

Preferably, the second component of the wind turbine blade comprises a structural laminate of a blade or a blade shell.

Preferably, the step of joining comprises applying an adhesive between the load-carrying flange of said at least one wind turbine blade component and the second component of the wind turbine blade.

There is further provided a forming tool for use in the manufacture of a wind turbine blade component as described above, the tool comprising:
a primary plate member; and
at least one barrier member depending from said primary plate member.

In one aspect, said at least one barrier member is hingedly attached to said primary plate member.

Additionally or alternatively, said at least one barrier member is releasably attachable to said primary plate member.

Additionally or alternatively, said at least one barrier member comprises a spring-loaded flange member.

Additionally or alternatively, said at least one barrier member is moveable on said plate member, such that the position of attachment of said at least one barrier member to said plate member is adjustable.

In one aspect, said at least on barrier member comprises a planar flange.

In a preferred aspect, said at least one barrier member comprises a curved surface to define a curved resin boundary. Preferably, said at least one barrier member presents a convex surface.

Preferably, said tool comprises a first barrier member provided at a first longitudinal side of said primary plate member and a second barrier member provided at a second longitudinal side of said primary plate member.

The barrier member may be formed from a substantially rigid material, e.g. a hard plastic or a metal. In alternative embodiments, the barrier member may be provided as a flexible plastics material, e.g. a vacuum bag, which can be sealed against the body of the web member.

There is also provided a wind turbine blade component comprising:
a web member; and
at least one load-carrying flange provided at a first end of said web member,
wherein said at least one load-carrying flange is formed from a cured resin, preferably a polyurethane resin.

In one aspect, said at least one load-carrying flange further comprises a quantity of fibre material suspended in the cured resin, e.g. chopped fibres.

There is also provided a wind turbine blade comprising:
a first wind turbine blade component as described above, and
a second component, wherein said second component is joined to said first wind turbine blade component via said at least one load-carrying flange.

Preferably a bond, preferably an adhesive bond, is positioned between the load-carrying flange of said first component and a surface of said second component.

The second component may comprise any suitable wind turbine blade component, e.g. a wind turbine blade shell, a structural laminate of a wind turbine, etc.

There is further provided a wind turbine comprising at least one wind turbine blade as described above.

DESCRIPTION OF THE INVENTION

Embodiments of the invention will now be described, by way of example only, with reference to the accompanying drawings, in which.

It will be understood that elements common to the different embodiments of the invention have been provided with the same reference numerals in the drawings.

Figure 1:
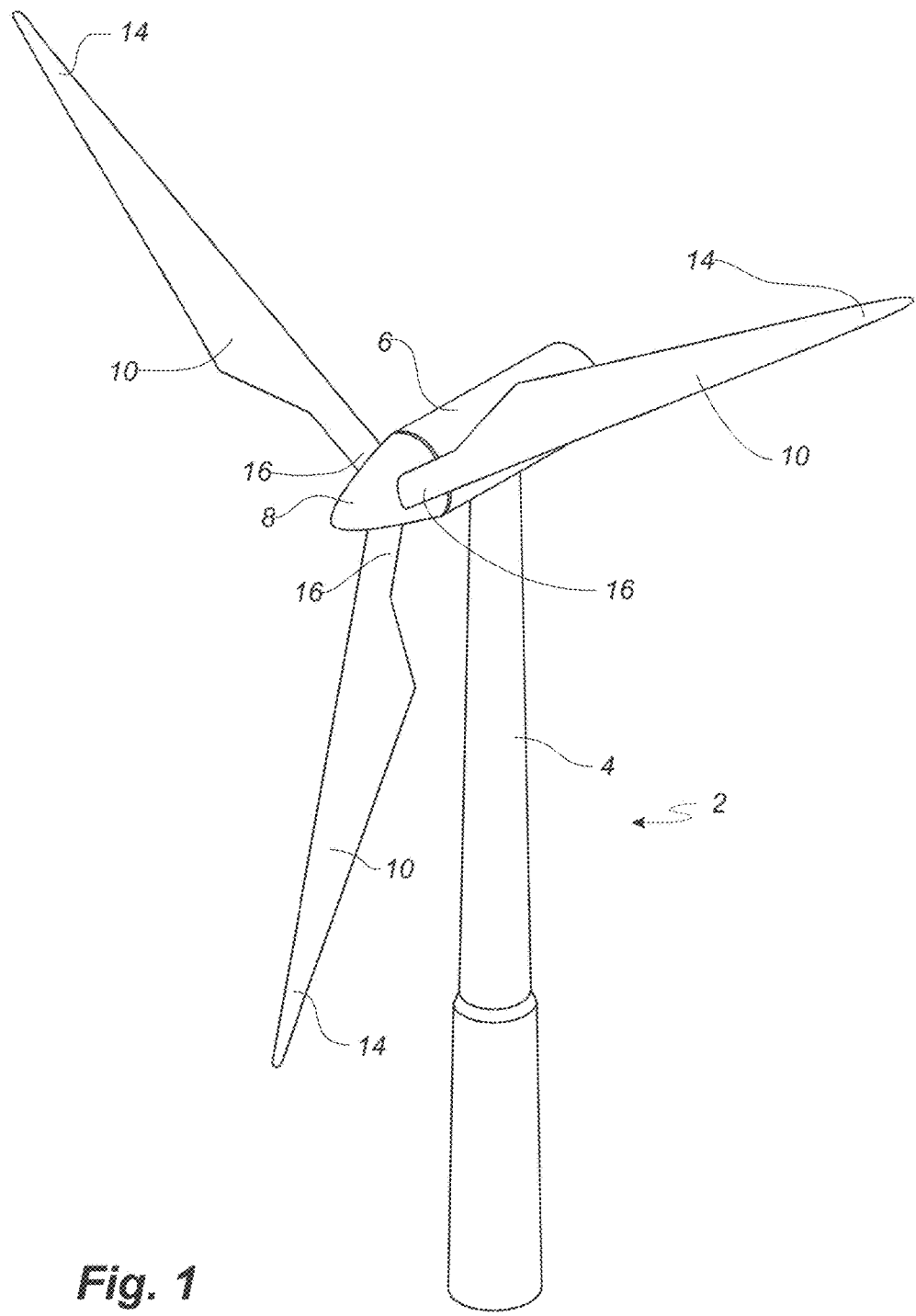
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
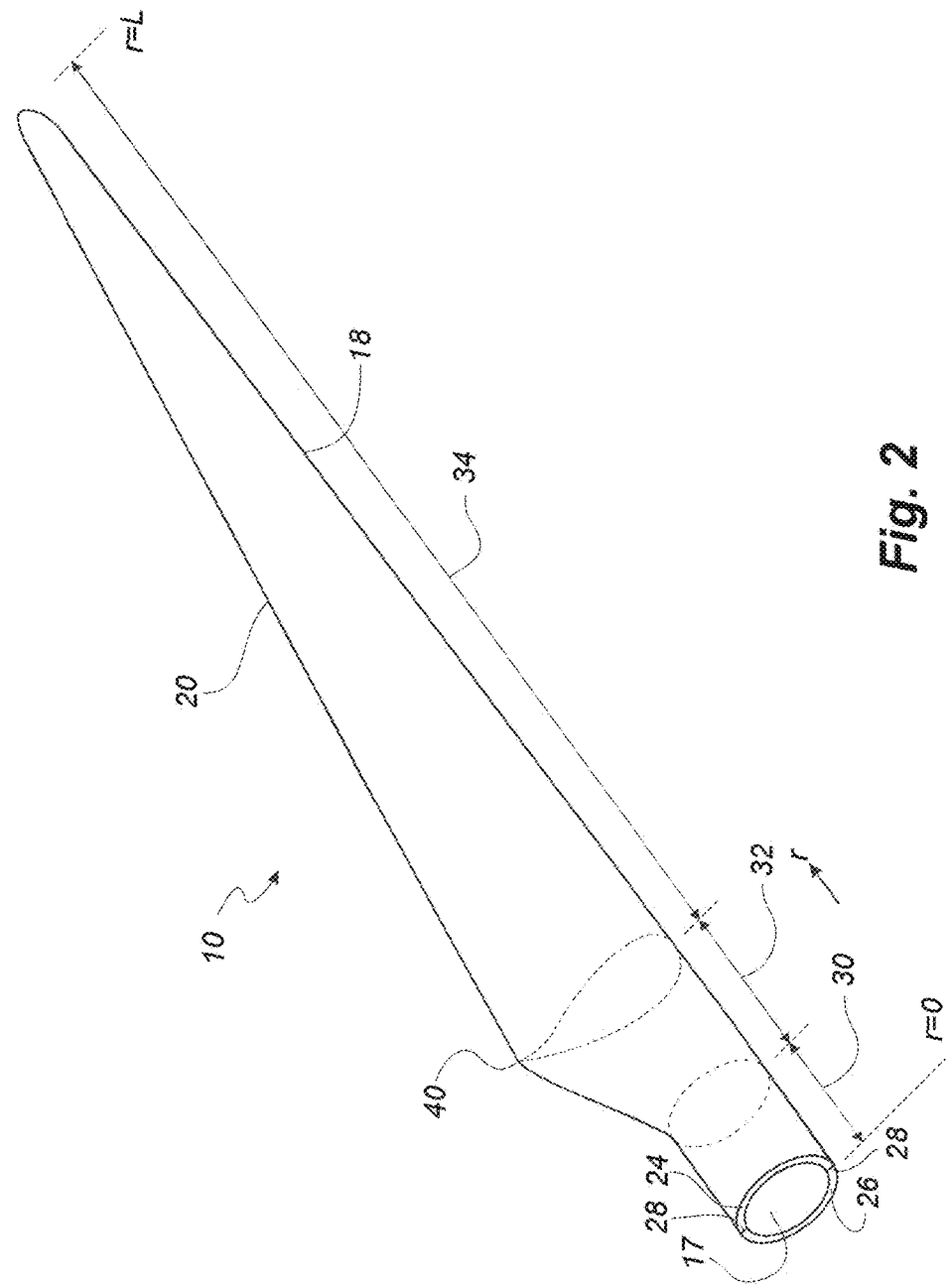
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
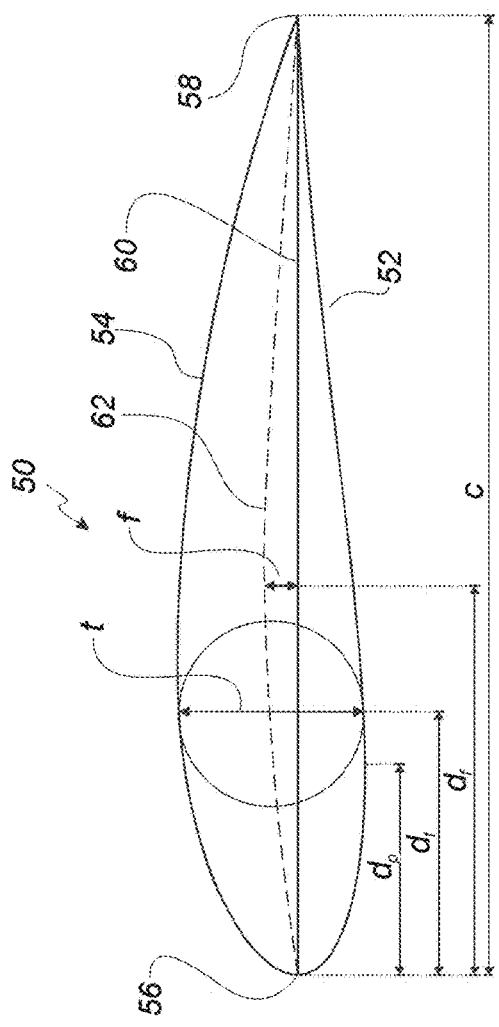
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

Figure 4:
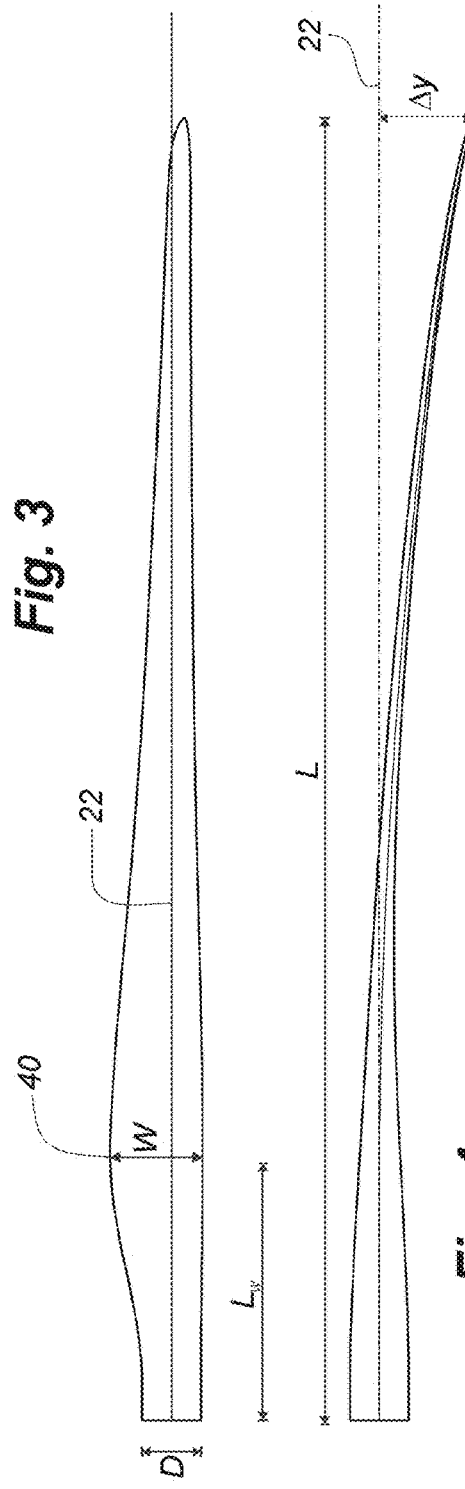
FIG. 4 shows a schematic view of the wind turbine blade of FIG. 2, seen from above and from the side.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

Figure 5:
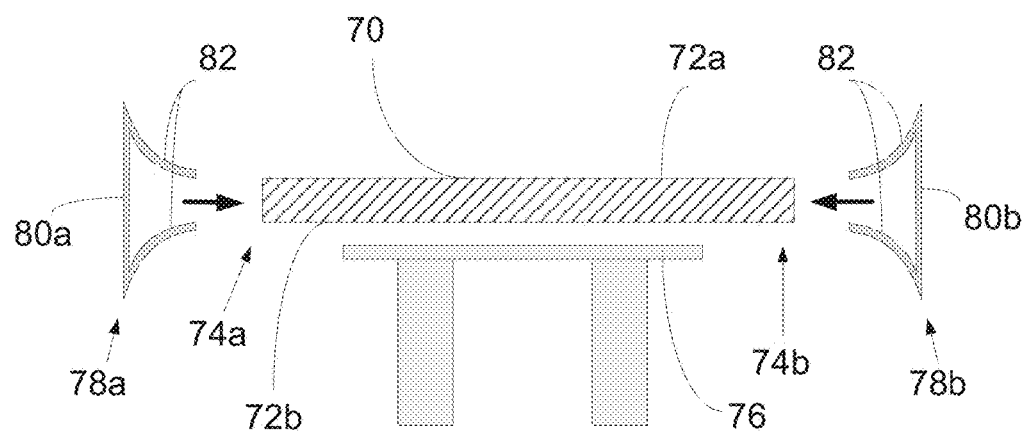
FIGS. 5-7 illustrate the steps of a manufacturing method for a wind turbine blade component according to an embodiment of the invention.
Figure 6:
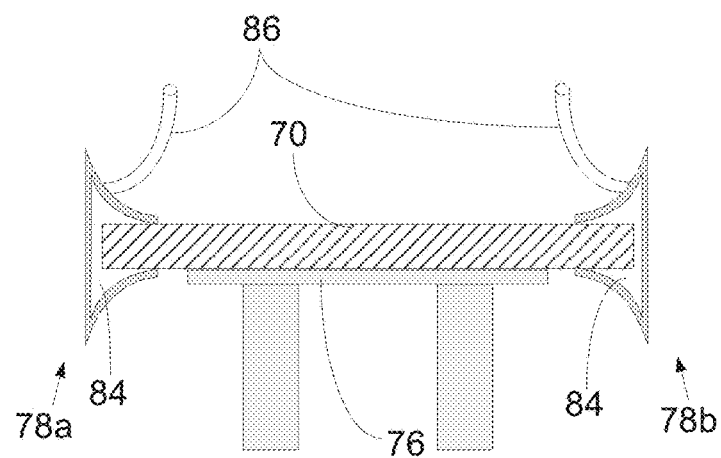
Figure 7:
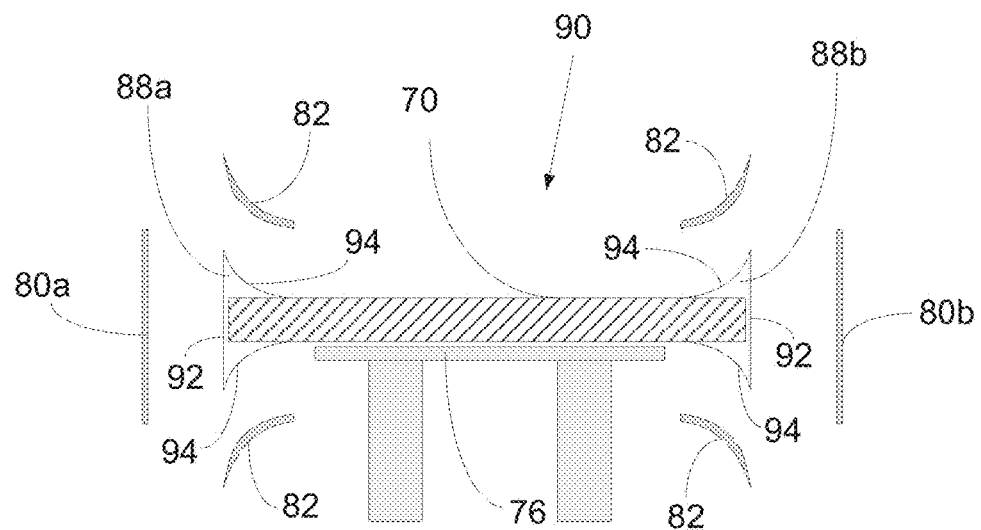

The wind turbine blade 10 comprises internal shear webs extending between opposed internal surfaces of the blade walls. FIGS. 5-7 show the steps of a manufacturing method according to the invention for the manufacture of a shear web for a wind turbine blade.

With reference to FIG. 5, a web member 70 is provided, preferably in the form of a composite sandwich panel construction, the web member 70 comprising an elongate substantially planar body having a relatively light-weight core and an outer skin layer. With regard to the cross-sectional profile illustrated in FIG. 5, the web member 70 comprises first and second major surfaces 72a,72b with first and second ends 74a,74b located at opposed ends of said major surfaces 72a,72b. The length of the web member 70 is selected to be the desired length of the shear web when in a blade, and may be in excess of 30 meters length. Alternatively, the web member 70 may be provided as a subsection of a larger shear web construction, wherein the shear web is manufactured in a number of separate longitudinal sections for subsequent assembly into an effective larger shear web.

It will be understood that the web member 70 may comprise a body having a constant width and thickness along the entire length of the web member 70. Alternatively, the width and/or the thickness of the web member 70 may vary along the longitudinal length of the web member 70, e.g. the width of the web member 70 may taper slightly along the length of the web member 70.

The web member 70 is placed on a simple support table 76, lying flat on one of said first and second major surfaces 72a,72b. It will be understood that said simple support 76 may comprise a single table, extending along the entire longitudinal length of said web member 70. Alternatively, said simple support may comprise a plurality of discrete supports, arranged at spaced locations along the length of the web member 70. The advantage of using a plurality of discrete supports is that the supports may be easily stored when not in use without taking up a large amount of floor space, when compared with a single relatively large support table.

First and second forming tools 78a,78b are applied to said first and second opposed ends 74a,74b. The forming tools 78a,78b each comprise a primary plate member 80a,80b which is arranged closely adjacent to and substantially parallel with the surface of the first and second ends 74a,74b of the web member 70. The primary plate members 80a,80b are selected to have a width greater than the thickness of the web member 70, such that the primary plate members 80a,80b extend clear of the edges of the first and second ends 74a,74b of the web member 70.

A pair of barrier members 82 extend from opposed sides of the respective primary plate members 80a,80b. The barrier members 82 extend in a direction towards the web member 70, such that when the forming tools 78a,78b are applied to said first and second opposed ends 74a,74b of the web member 70, the barrier members 82 abut against the opposite faces of said first and second major surfaces 72a,72b adjacent the respective first and second ends 74a, 74b of the web member 70.

Preferably, the barrier member 82 is positioned such that a free end of said barrier member is located at a point along the major surface of said web member between approximately 25-125 mm, preferably between approximately 50-100 mm, from the end of said web member. The barrier member 82 may be sealed against the surface of the web member 70, for example through the application of a separate sealant between the barrier member 82 and the web member 70.

When the forming tools 78a,78b are applied to said first and second ends 74a,74b, flange-shaped cavities 84 are defined in the space between the respective primary plate members 80a,80b, the barrier members 82 and the first and second ends 74a,74b of the web member 70, see FIG. 6. The open ends of said cavities can be sealed, and a resin introduced to the cavities via appropriate inlet/outlet connections 86. In a preferred embodiment, an resin inlet is arranged at a first end of a cavity 84, with a resin outlet arranged at an opposed second end of the cavity 84, the resin introduced via the inlet at an overpressure, or at a pressure level above atmospheric pressure, while a vacuum or low pressure is applied at the outlet, such that the resin is drawn along the cavity 84 towards the outlet.

The cavities 84 are filled with the resin, which is subsequently allowed to cure. The cured resin assumes the shape of the cavities 84 to form first and second flanges 88a,88b arranged at said first and second ends 74a,74b of the web member 70. Preferably, the resin is a durable resin, which can act as a load-bearing member when cured. Preferably, the resin is a polyurethane resin.

With reference to FIG. 7, once the resin has cured to form the flanges 88a,88b, the forming tools 78a,78b can be removed from the respective first and second ends 74a,74b of the web member 70, leaving a wind turbine blade shear web component 90 comprising a main body formed from a web member, preferably a sandwich panel construction, and first and second load-bearing flanges 88a,88b formed from cured resin. The finished shear web component 90 can be removed from the support 76 and used in the manufacture and assembly of a wind turbine blade 10.

It will be understood that the barrier members 82 are preferably attached to the primary plate member 80a,80b, for example the barrier members 82 may be releasably attached to the plate member 80a,80b. Additionally or alternatively, the location of the barrier members 82 on the surface of the primary plate member 80a,80b may be adjustable on the primary plate member 80a,80b, such that the dimensions of the cavity 84 formed by the forming tool 78a,78b, and the subsequent resin-formed flange 88a,88b, can be adjusted as required. As shown in FIG. 7, the barrier members 82 may be detached from the primary plate members 80a,80b to facilitate removal of the forming tools 78a,78b from the cured flanges 88a,88b. In an additional or alternative aspect, the barrier members 82 may be hingedly attached to the primary plate members 80a,80b, to allow for the relative movement of the barrier members 82 to allow for the forming tools 78a,78b to be installed on or removed from a workpiece.

Preferably, the barrier members 82 are arranged on said primary plate member 80a,80b at a distance of between approximately 50-150 mm between the attachment point of said barrier members on said primary plate member, preferably between approximately 60-120 mm, preferably approximately 90 mm. The positioning of the barrier members acts to determine the width of the formed load-bearing flange 88a,88b.

The load-bearing flanges 88a,88b each comprise a major flange surface 92 with a pair of side walls 94 depending therefrom, the side walls 94 extending from the ends of the major flange surface 92 to a location on the first and second major surfaces 72a,72b of the web member 70. The major flange surface 92 presents a bonding surface for use in connecting the shear web component 90 to further components of a wind turbine blade 10.

While the embodiment shown in FIGS. 5-7 illustrate the manufacture of flanges 88a,88b having a major flange surface 92 parallel to the end surfaces of the first and second ends 74a,74b of the web member 70, it will be understood that the forming tools 78a,78b may be arranged on the web member 70 such that the primary plate member 80a,80b is angled relative to the web member 70, preferably arranged at an angle of between approximately −5 to +20 degrees to the end surfaces of said web member 70. By adjusting the angling of the primary plate member 80a,80b, the resultant load-bearing flange 88a,88b formed by the tool may be angled to comply with the surfaces of the blade components it is desired to join to the shear web component 90.

Figure 8:
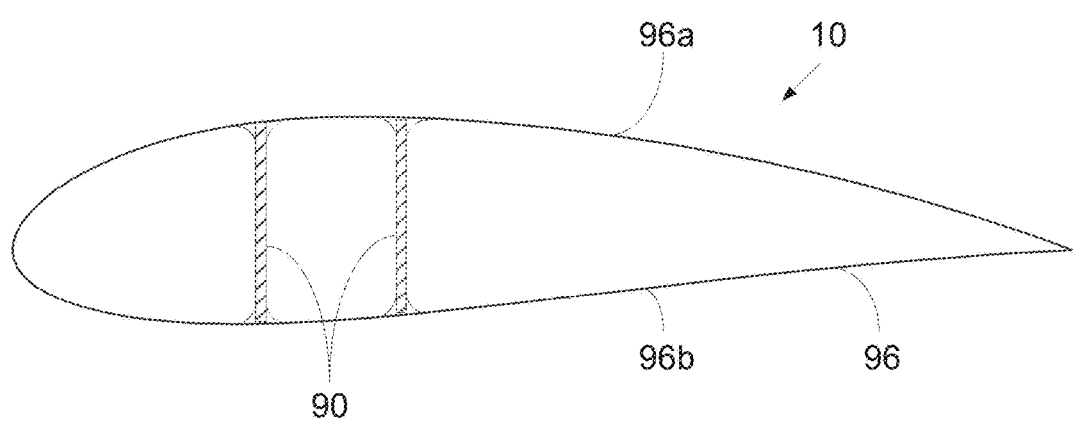
FIG. 8 illustrates a cross-sectional view of a wind turbine blade incorporating a wind turbine blade component as manufactured in FIGS. 5-7.

With reference to FIG. 8, a cross-sectional view of a wind turbine blade 10 according to the invention is shown. The blade 10 comprises a blade shell body 96, formed of an upper shell half 96a and a lower shell half 96b. During manufacture of the wind turbine blade 10, the shell halves 96a,96b are formed in separate blade moulds (not shown) for assembly into a wind turbine blade. Prior to assembly, a pair of shear web components 90 manufactured according to the method described above are positioned within the lower shell half 96b, such that when the shell halves are closed to form the blade 10, the shear web components 90 extend between opposed internal surfaces of the blade shell body 96, to provide reinforcement strength and stiffness to the finished blade construction.

The shear web components 90 are preferably bonded to the internal surfaces of the shell body 96 using an adhesive applied to a bonding area defined on the shell halves 96a,96b and/or to the major flange surface 92 of the shear web components 90. The adhesive is pressed between the components during the closing of the shell halves 96a,96b, to join the shear web components 90 to the blade shell body 96. It will be understood that the primary plate member 80a,80b of the forming tool 78a,78b may be shaped or scored, such that the major flange surface 92 of the shear web components 90 is accordingly cast with a shaped or treated surface, which may act to improve the bonding between the flange 88a,88b and any other blade component.

In the embodiment of FIGS. 5-7, the barrier members 82 are shaped to present a convex inner surface of the formed cavity 84. Accordingly, the side walls 94 of the load-bearing flanges 88a,88b present a curved, concave surface after curing of the resin. The use of such a shaped or tapered surface results in an improved transfer of forces from the load-bearing flange 88a,88b to the web member 70 of the shear web component 90.

It will be understood that other flange shapes may be formed by the selection of suitable forming tools 78a,78b, e.g. a bell-shaped flange, a triangle shaped flange, etc.

Figure 9:
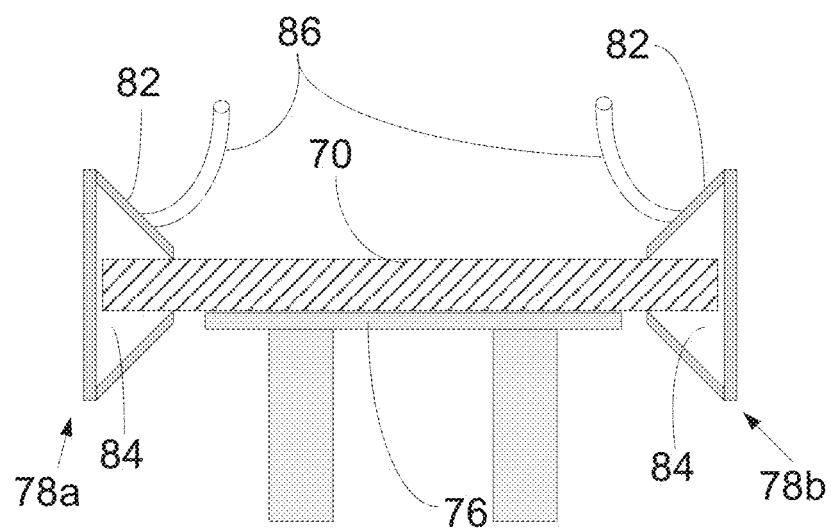
FIGS. 9 and 10 illustrate the steps of a manufacturing method for a wind turbine blade component according to another embodiment of the invention.
Figure 10:
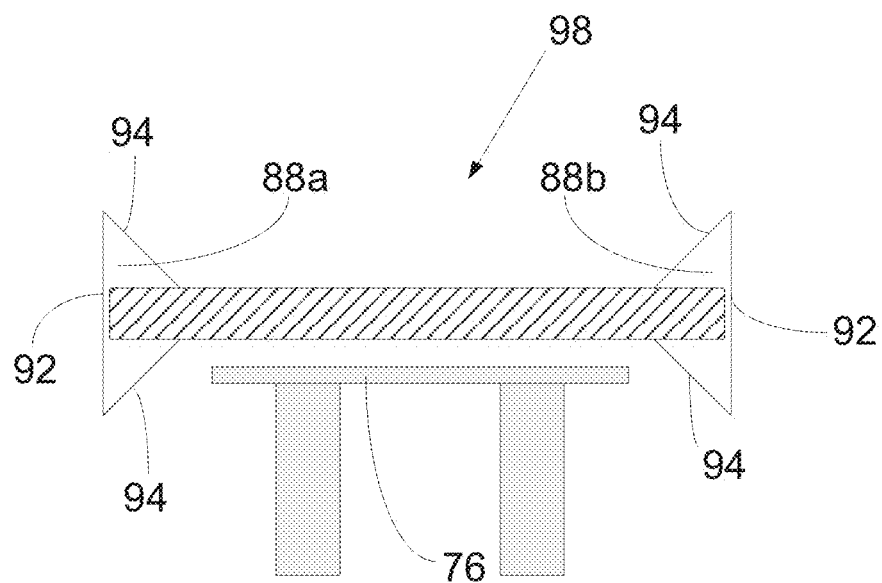

With reference to FIGS. 9 & 10, a further embodiment of the invention is illustrated, wherein the barrier members 82 are formed as planar members which extend from opposed sides of the primary plate members 80a,80b towards the web member 70. Accordingly, the cavities 84 formed with such a configuration of forming tool 78a,78b result in the creation of a component 98 triangle-shaped load-bearing flanges 88a,88b, FIG. 10.

The forming tools 78a,78b are preferably arranged such that the space defined between the primary plate member 80a,80b and the respective first and second ends 74a,74b of the web member 70 is sufficient to ensure an appropriate depth of the resin-based flange adjacent the first and second ends 74a,74b of the web member 70. Preferably, said space is between approximately 1-20 mm, preferably between approximately 2-15 mm.

In a further aspect of the invention, it will be understood that the arrangement of the forming tools 78a,78b and the barrier members 82 may be selected dependent on the particular component to be manufactured. For example, while the above embodiments detail the manufacture of I-shaped shear web components, it will be understood that C-shaped web components may be effectively manufactured by positioning the forming tools 78a,78b such that a first of said barrier members 82 extends adjacent to and substantially parallel to a portion of a major surface of said web member 70, while a second of said barrier members 82 extends in a tapered or curved manner towards the opposed major surface of said web member 70, to define a cavity for the formation of a single-sided flange at one end of a web member 70. The forming tool 78a,78b arrangement may be replicated at the opposite end of the web member 70, allowing for insertion of resin into the defined cavities as described above, resulting in the formation of a C-shaped shear web component.

The barrier members 82 may be formed of any suitable material, e.g. a substantially rigid material, such as a hard plastic or a metal; or a flexible plastics material, e.g. a vacuum bag, which can be sealed against the body of the web member. Preferably, the primary plate member 80a,80b of the forming tool 78a,78b is formed from a relatively resilient or hardened material.

The resin may be augmented through the addition of material to improve the strength performance of the cured resin flange. Preferably, small fibres, e.g. chopped fibres, may be added to the resin.

The invention provides a system and method for the manufacture of wind turbine blade components having reduced capital expense and setup time, which can be easily stored when not in use. In addition, the use of cured resin to form a load-bearing flange of the component allows for the flange geometry to be accurately controlled to correspond with the surfaces to which the component is to be joined.

The invention is not limited to the embodiments described herein, and may be modified or adapted without departing from the scope of the present invention.

The invention claimed is:

1. A method of manufacturing a wind turbine blade component having a load-carrying flange, the method comprising the steps of:
   providing a web member;
   arranging a forming tool adjacent at least a first end of said web member to form a flange-shaped cavity between said forming tool and said first end;
   injecting a load-carrying resin into said cavity;
   curing said resin to form a load-carrying flange comprised of cured resin at said first end; and
   removing said forming tool from said first end, wherein the method comprises the step of providing a forming tool having a primary plate member and at least one barrier member depending therefrom, and wherein the step of arranging comprises:
   positioning said primary plate member adjacent the first end of said web member, and
   positioning said at least one barrier member where said at least one barrier member extends between said primary plate member and a side face of said web member adjacent said first end, and said cavity is at least partially formed between said primary plate member, said at least one barrier member, and said web member.

2. The method of claim 1, wherein said primary plate member is positioned forming a space of between approximately 1-20 mm between said primary plate member and said first end of said web member.

3. The method of claim 1, wherein said at least one barrier member is positioned with a free end of said at least one barrier member located at a point along the side face of said web member between approximately 25-125 mm from the first end of said web member.

4. The method of claim 1, wherein the method comprises the step of providing said at least one barrier member and said at least one barrier member presents a convex inner surface of said cavity, between said primary plate member and said side face of said web member.

5. The method of claim 1, wherein said primary plate member presents a first surface of said cavity, said first cavity surface shaped to form a first surface of the load-carrying flange, wherein said step of positioning said primary plate member comprises angling said primary plate member relative to said first end of said web member in a desired orientation for the load-carrying flange of the wind turbine blade component.

6. The method of claim 5, wherein said step of angling comprises arranging said primary plate member at an angle of between −5 to +20 degrees to the first end of said web member.

7. The method of claim 1, wherein said web member comprises an elongate planar body having opposed first and second ends, and wherein the method further comprises the steps of:
   applying a first additional forming tool at a first end of said planar body to form a first flange-shaped cavity;
   applying a second additional forming tool at a second end of said planar body to form a second flange-shaped cavity;
   injecting a secondary load-carrying resin into said first and second cavities;
   curing said secondary load-carrying resin to form first and second load-carrying web flanges comprised of cured resin at respective first and second ends of said planar body; and
   removing said first and second forming tools to provide a wind turbine blade component having first and second web flanges located at opposed ends of said web member.

8. The method of claim 1, comprising the step of providing a resin having a quantity of fibre material mixed into the resin.

9. A method of manufacturing a part of a wind turbine blade, comprising the steps of:
   manufacturing at least one wind turbine blade component according to the method of claim 1; and
   joining said at least one wind turbine blade component to a second component of said wind turbine blade via the load-carrying flange of said at least one wind turbine blade component.

10. The method of manufacturing a wind turbine blade component having a load-carrying flange according to claim 1, wherein the load-carrying resin comprises polyurethane.

11. The method of manufacturing a wind turbine blade component having a load-carrying flange according to claim 7, wherein the secondary load-carrying resin comprises polyurethane.

12. The method of manufacturing a wind turbine blade component having a load-carrying flange according to claim 8, wherein the quantity of fibre material comprises chopped fibres.

13. The method of claim 2, wherein the space is between approximately 2-15 mm.

14. The method of claim 3, wherein the free end of said at least one barrier member is located at a point along the side face of said web member between approximately 50-100 mm from the first end of said web member.

* * * * *